US009934383B2

(12) United States Patent
Buhler et al.

(10) Patent No.: US 9,934,383 B2
(45) Date of Patent: Apr. 3, 2018

(54) ENABLING AN EXTERNAL OPERATING SYSTEM TO ACCESS ENCRYPTED DATA UNITS OF A DATA STORAGE SYSTEM

(71) Applicant: International Business Machines Corporation, Armonk, NY (US)

(72) Inventors: Peter Buhler, Rueschlikon (CH); Thomas Gschwind, Rueschlikon (CH); Paolo Scotton, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 104 days.

(21) Appl. No.: 14/686,022

(22) Filed: Apr. 14, 2015

(65) Prior Publication Data
US 2015/0310214 A1    Oct. 29, 2015

(30) Foreign Application Priority Data

Apr. 24, 2014 (GB) .................................. 1407187.2

(51) Int. Cl.
*G06F 21/00* (2013.01)
*G06F 21/57* (2013.01)
(Continued)

(52) U.S. Cl.
CPC ........ *G06F 21/575* (2013.01); *G06F 21/6281* (2013.01); *H04L 9/32* (2013.01)

(58) Field of Classification Search
CPC .................................................. G06F 21/575
(Continued)

(56) References Cited

U.S. PATENT DOCUMENTS 7,676,840 B2 * 3/2010 Morais .................. G06F 21/575
                                                     711/102
7,908,489 B2    3/2011 Mimatsu
(Continued)

FOREIGN PATENT DOCUMENTS

GB        2508895 A      6/2014
JP        2013-41369 A   2/2013

OTHER PUBLICATIONS

List of IBM Patents or Patent Applications Treated as Related.
Examination Report dated Apr. 13, 2016 received from the Great Britain Patent Office.

*Primary Examiner* — Taghi Arani
*Assistant Examiner* — Khalil Naghdali
(74) *Attorney, Agent, or Firm* — Scully, Scott, Murphy & Presser, P.C.; David M. Quinn, Esq.

(57) ABSTRACT

The present invention is notably directed to a method for allowing an operating system, or OS, to access an encrypted data storage system of a computer (10), wherein: the data storage system (11) comprises: a partition (122); and first encrypted data units (120) that comprise partition table data of said data storage system; and said computer (10) is connectable to an external device (20) comprising: a boot loader (24) for an external OS (112) that is not installed on the computer; and partitioning information (22) capturing an expected location of said partition (122) in the data storage system; and wherein second encrypted data units (220) that comprise reference partition table data for said data storage system are available from said computer (10) or said external device, the method comprising: upon connection (S21) of said external device (20) to the computer, instructing to boot (S23) the computer (10) from said boot loader (24); and during or after booting of the computer: comparing (S25) the first (120) and second encrypted data units (220); and if (S27) the first and second encrypted data units match, allow (Continued)

(S28) the external OS (112) to access, based on the partitioning information (22) stored on the external device, one or more data units (14) of said partition on the data storage system (11). The present invention is further directed to related devices, systems and computer program products.

14 Claims, 8 Drawing Sheets

(51) Int. Cl.
*H04L 9/32* (2006.01)
*G06F 21/62* (2013.01)

(58) Field of Classification Search
USPC .......................................................... 713/182
See application file for complete search history.

(56) References Cited

U.S. PATENT DOCUMENTS

| | | | |
|---|---|---|---|
| 8,166,297 B2 | 4/2012 | Headley | |
| 2003/0105968 A1* | 6/2003 | Cheston | G06F 21/575 713/191 |
| 2004/0044886 A1 | 3/2004 | Ng et al. | |
| 2005/0193195 A1 | 9/2005 | Wu et al. | |
| 2008/0271163 A1* | 10/2008 | Stillerman | G06F 21/572 726/30 |
| 2009/0276509 A1 | 11/2009 | Huang | |
| 2015/0134943 A1* | 5/2015 | Lee | G06F 9/4406 713/2 |

* cited by examiner

ENABLING AN EXTERNAL OPERATING SYSTEM TO ACCESS ENCRYPTED DATA UNITS OF A DATA STORAGE SYSTEM

CROSS-REFERENCE TO RELATED APPLICATIONS

This application is based on and claims the benefit of priority from commonly-owned United Kingdom Patent Application 1407187.2, filed on Apr. 24, 2014.

FIELD OF THE INVENTION

The invention relates in general to the field of methods for securely booting computers, and in particular to methods for allowing an external operating system to access a partition on a data storage system of a computer.

BACKGROUND OF THE INVENTION

Technologies are needed to allow software to be executed on any non-previously prepared or reviewed computer (e.g., an employee's private PCs) while ensuring that its execution is secure, e.g., as secure as on a corporate/company PC. Such a technology would enable a trusted bring your own (BYO) computing work environment. BYO generally relates to "Bring your own device" (BYOD), "bring your own technology" (BYOT), or closely related, "bring your own behavior" (BYOB). BYOD or BYOT concerns corporate/business policy of how employees can bring and use personal mobile devices at work and access employers' email, databases and files, while otherwise using such devices at home, whereby personal applications/data are accessed through the same devices. Beyond hardware, BYOB extends this to software used on the device.

Besides, it is well-known that any software executed on a computer (e.g., a PC) may be attacked by viruses and malicious software (malware) that may be present on the computer's operating system. One solution for this problem is to restart the PC from an external boot media, e.g., stored on a user-trusted device, typically a secure device, and start a new and—from a security perspective—clean operating system (OS) from the external media. An example of such a user-trusted device is the so-called Zone Trusted Information Channel (or ZTIC for short).

In a bring-your-own (BYO) scenario, one may want to start an operating system, or OS, on a computer that has already been prepared with another (e.g., native) OS and whose hard drive is fully encrypted. One solution is to rely entirely on an external memory stick where the BYO OS's data are stored to start the computer from this external device without using the local hard drive. A downside of this solution is that it requires a fast memory stick for the booted OS to be usably fast. Another issue is that if the swap space is located on the external drive, the memory stick may fail quickly (as most memory sticks allow limited block write operations).

BRIEF SUMMARY OF THE INVENTION

According to a first aspect, the present invention is embodied as a method for allowing an operating system, or OS, to access an encrypted data storage system of a computer, wherein:

the encrypted data storage system comprises:
    a partition; and
    first encrypted data units that comprise partition table data of said data storage system, and
said computer is connectable to an external device comprising:
    a boot loader for an external OS that is not installed on the computer; and
    partitioning information capturing an expected location of said partition in the data storage system, and
second encrypted data units that comprise reference partition table data for said data storage system are available from said computer or said external device,
the method comprising:
upon connection of said external device to the computer, instructing to boot the computer from said boot loader; and
during or after booting of the computer:
    comparing the first and second encrypted data units; and
    if the first and second encrypted data units match, allow the external OS to access, based on the partitioning information stored on the external device, one or more data units of said partition on the data storage system.

In embodiments, the method further comprises, prior to instructing to boot the computer from said boot loader: when an encryption key and a decryption key for writing to and reading from said data storage system, respectively, are available, setting up said partition of the data storage system, using said encryption key and said decryption key; and storing, on said external device, said partitioning information capturing the location of said partition in the data storage system, wherein said partitioning information preferably comprises an identifier of a first block and/or an identifier of a last block of this partition.

Preferably, the method further comprises, prior to instructing to boot the computer from said boot loader: reading, from the data storage system, said first encrypted data units and storing the second encrypted data, which preferably are a copy of said first encrypted data units, wherein, preferably, reading said first encrypted data units comprises reading raw encrypted data units via an OS installed on the computer, for example a native OS, and more preferably via an application programming interface, or API, of this OS installed on the computer.

In preferred embodiments, reading said first encrypted data units is performed after connecting said external device to the computer and after instructing to boot the computer from said boot loader, according to a function provided by said external device, preferably by the boot loader itself or the external OS itself.

In embodiments, at the step of comparing, the second encrypted data reside on said external device or on another external device connectable to the computer.

In variants, at the step of comparing, the second encrypted data reside on the data storage system, preferably inside said partition.

In preferred embodiments, the method further comprises: if the first and second encrypted data units do not match, then: instructing the computer to boot independently from said external OS to make available a decryption key for reading from said data storage system; and analyzing the data storage system, wherein analyzing comprises decrypting the partition table using this decryption key.

For instance, the method further comprises, upon analyzing the data storage system: if contents of the first encrypted data units have changed, updating said second encrypted data units to make them available from said computer or from said external device, preferably by storing said second encrypted data units on one of: said external device; or on the data storage system and more preferably inside said partition of the data storage system.

Preferably, the method further comprises, upon analyzing the data storage system: if a location of said partition has changed, storing, on said external device, updated partitioning information capturing the changed location of said partition in the data storage system.

In embodiments, the method further comprises, upon analyzing the data storage system: if the partition was deleted, setting up a new partition of the data storage system.

Preferably, said external device is a user trusted device, comprising; a connection interface enabling connection with a computer; and a persistent memory, the latter storing: said boot loader for said external OS; said partitioning information; and, preferably, said second encrypted data units; and, more preferably, software modules, which comprise one or more of the following: application components; operating system image components for said external OS; and, more preferably, hardware component drivers for said external OS.

According to another aspect, the invention is embodied as a computerized system, comprising:
a computer, with a data storage system that comprises:
  a partition; and
  first encrypted data units that comprise partition table data of said data storage system, and
an external device, to which said computer is connectable, said external device comprising:
  a boot loader for an external OS; and
  partitioning information capturing an expected location of said partition in the data storage system,
and wherein,
the computerized system further comprises second encrypted data units that comprise reference partition table data for said data storage system, where said second encrypted data units are available from said data storage system or said external device.

Preferably, the computerized system further comprises computerized methods that preferably are stored on the external device, and which are designed to implement all the steps of methods as mentioned above.

According to another aspect, the invention is embodied as a user trusted device, comprising:
a boot loader configured for allowing to boot a computer therefrom;
partitioning information capturing an expected location of a partition of a the data storage system of said computer; and
preferably, second encrypted data units that comprise reference partition table data for said data storage system, wherein said second encrypted data match first encrypted data units stored on said data storage system.

According to a final aspect, the invention is embodied as a computer program product for allowing an operating system, or OS, to access encrypted data units of a data storage system of a computerized system, the computer program product comprising a computer-readable storage medium having computer-readable program code embodied therewith, the computer-readable program code configured to implement a method according to one or more of the above embodiments.

Devices, systems, methods and computer program products embodying the present invention will now be described, by way of non-limiting examples, and in reference to the accompanying drawings.

BRIEF DESCRIPTION OF SEVERAL VIEWS OF THE DRAWINGS

In FIG. 5A, the partitions' data are symbolically depicted as being available, while FIG. 5B depicts the same partitions when encrypted.

DETAILED DESCRIPTION OF THE INVENTION

The following description is structured as follows. First, general embodiments and high-level variants are described (sect. 1). The next section addresses more specific embodiments and technical implementation details (sect. 2).

1. General Embodiments and High-Level Variants

In reference to FIGS. 1-5, an aspect of the invention is first described, which concerns a method for allowing an operating system (hereafter "OS", for short) to access an encrypted data storage system.

The context assumed is the following: a computer (or a computerized system) 10 is provided, which comprises a data storage system 11, the latter being typically a hard disk drive (HDD) or a solid state device (SDD) memory, e.g., flash memory. Some of the embodiments discussed below assume a hard disk, without prejudice. More generally yet, the data storage system 11 can be any storage system that supports partitioning.

The computer 10 may typically comprise a native OS 111 already installed or a host OS. Still, embodiments of the present invention can in principle also be implemented even if no native OS is installed or no suitable OS is available on the computer 10, as discussed later.

Figure 1:
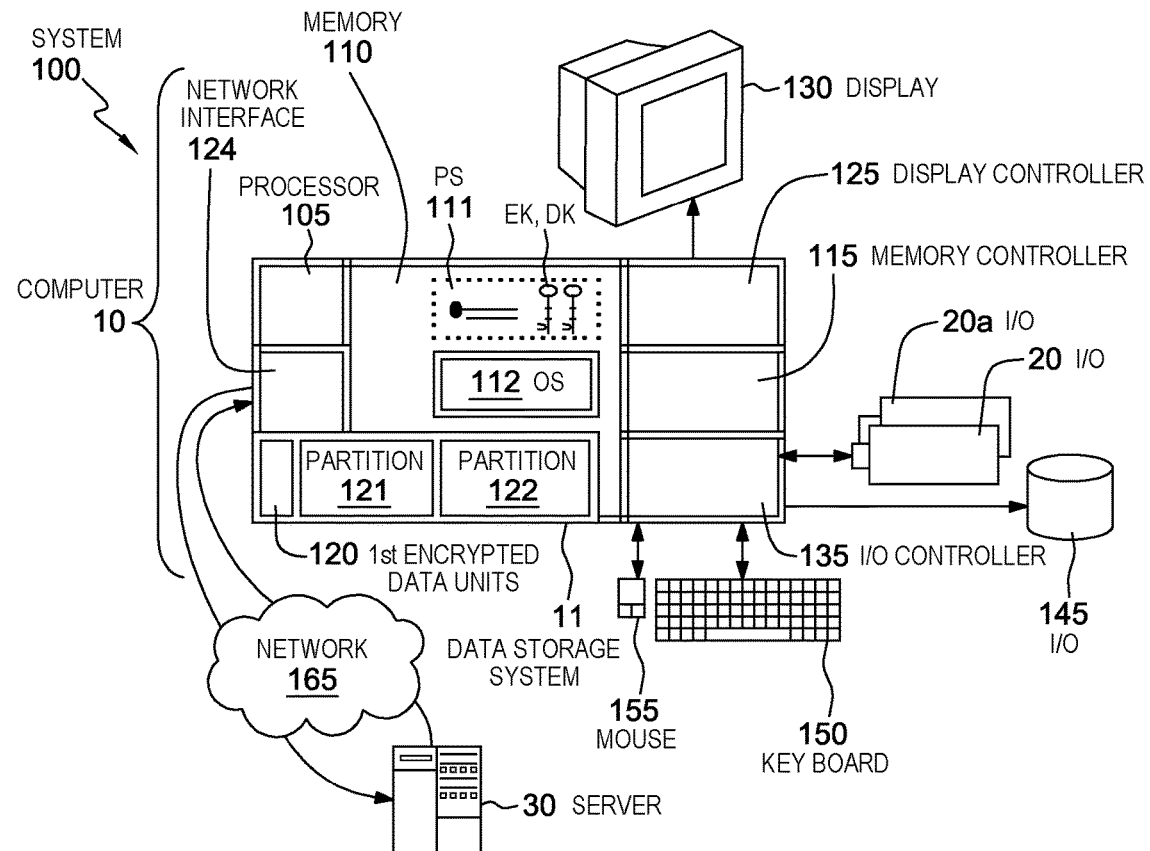
FIG. 1 schematically represents a general purpose computerized system according to embodiments of the invention; this system is specifically designed for implementing method steps involved in embodiments of the invention.
Figure 5A:
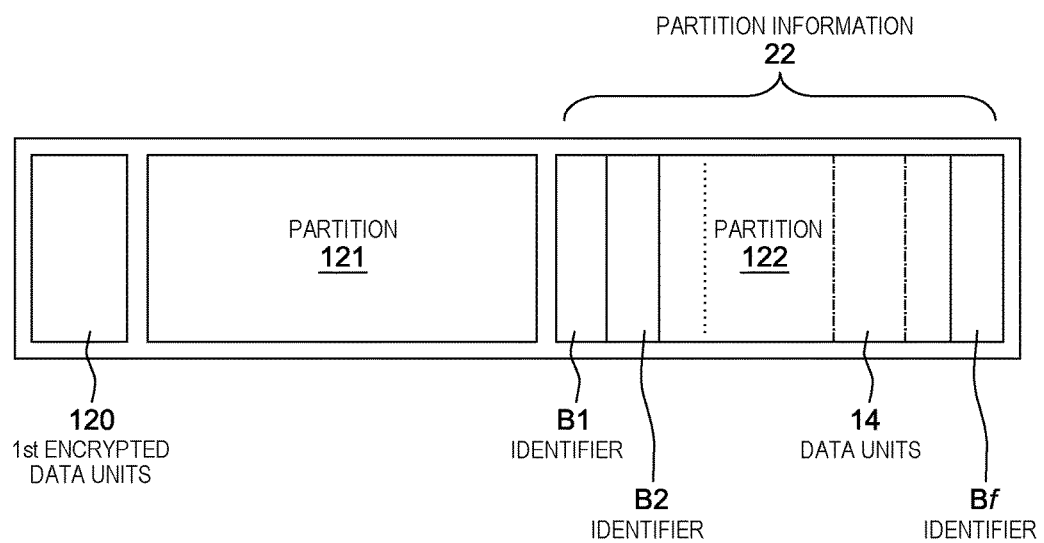
FIGS. 5A and 5B schematically illustrates partitions of a data storage system, as well as partitioning information therein and partition table data, as used in embodiments.
Figure 5B:
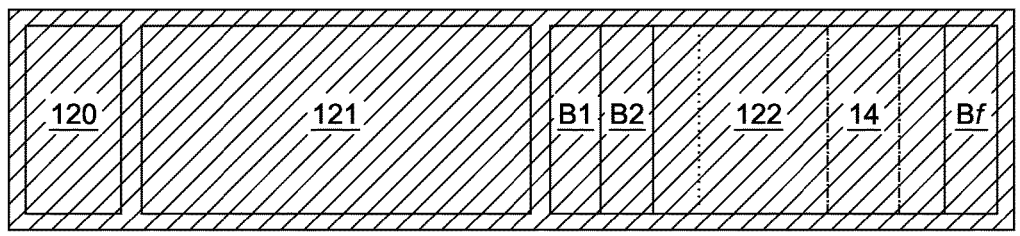

The data storage system 11 comprises notably one partition 122 of interest, it being noted that said partition 122 is typically a second partition, as a prior partition 121 may already exist, as depicted in FIG. 1 or 5.

The data storage system 11 further comprises first encrypted data units 120, which units comprise partition table data of the storage system 11.

Figure 2:
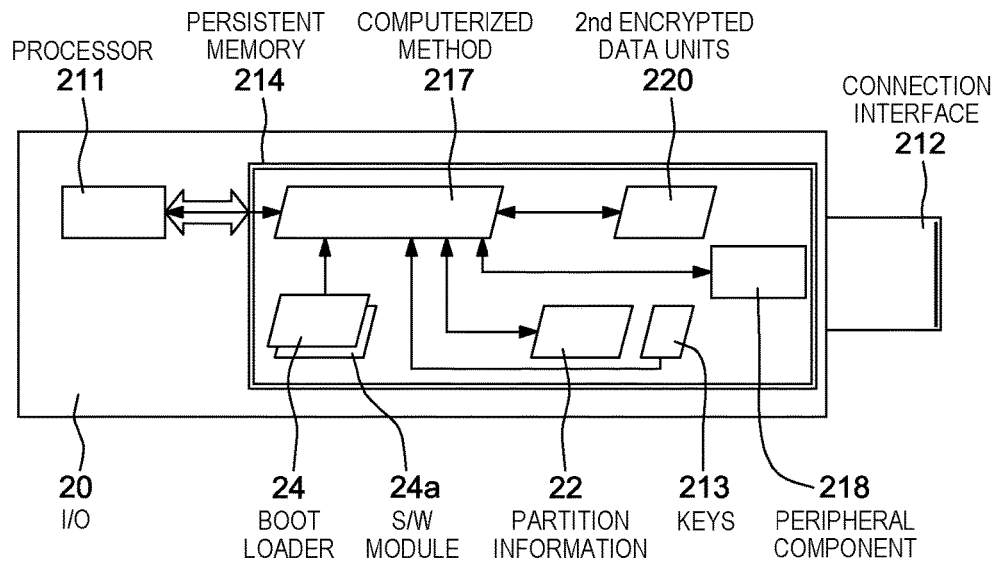
FIG. 2 schematically represents a user trusted device, according to embodiments of the invention; this device is specifically designed for implementing method steps involved in embodiments of the invention.

The computer 10 is furthermore connectable to an external device 20, which typically is a user trusted (secure) device, as depicted in FIGS. 1 and 2.

The external device 20 notably comprises a boot loader 24 for an external OS 112 that is not installed on the computer 10 yet. Or at least, this OS 112 is not completely installed (some components may already reside on the storage 11). What is called boot loader here is typically a set of software modules (also later referred to as "components" or "parts") that can perform various operations, upon execution at the computer 10, possibly interactively with other components executing at the device 20, to boot the computer 10. Typically, the boot loader (or at least a part thereof) is detectable by the initialization firmware, e.g., the BIOS. It notably comprises instructions for this firmware to initiate a transfer of at least some of its components onto the computer 10 for subsequent execution.

The device 20 further comprises partitioning information 22, i.e., information that captures an expected location of the partition 122 of interest in the storage system 11, see FIG. 5.

Finally, second encrypted data units 220 are available from the computer 10 or the external device 20. These which units too comprise reference partition table data for the data storage system. They typically are a copy of the units 120 (or a part thereof). Such reference data will be used for a comparison, as explained later.

Figure 3:
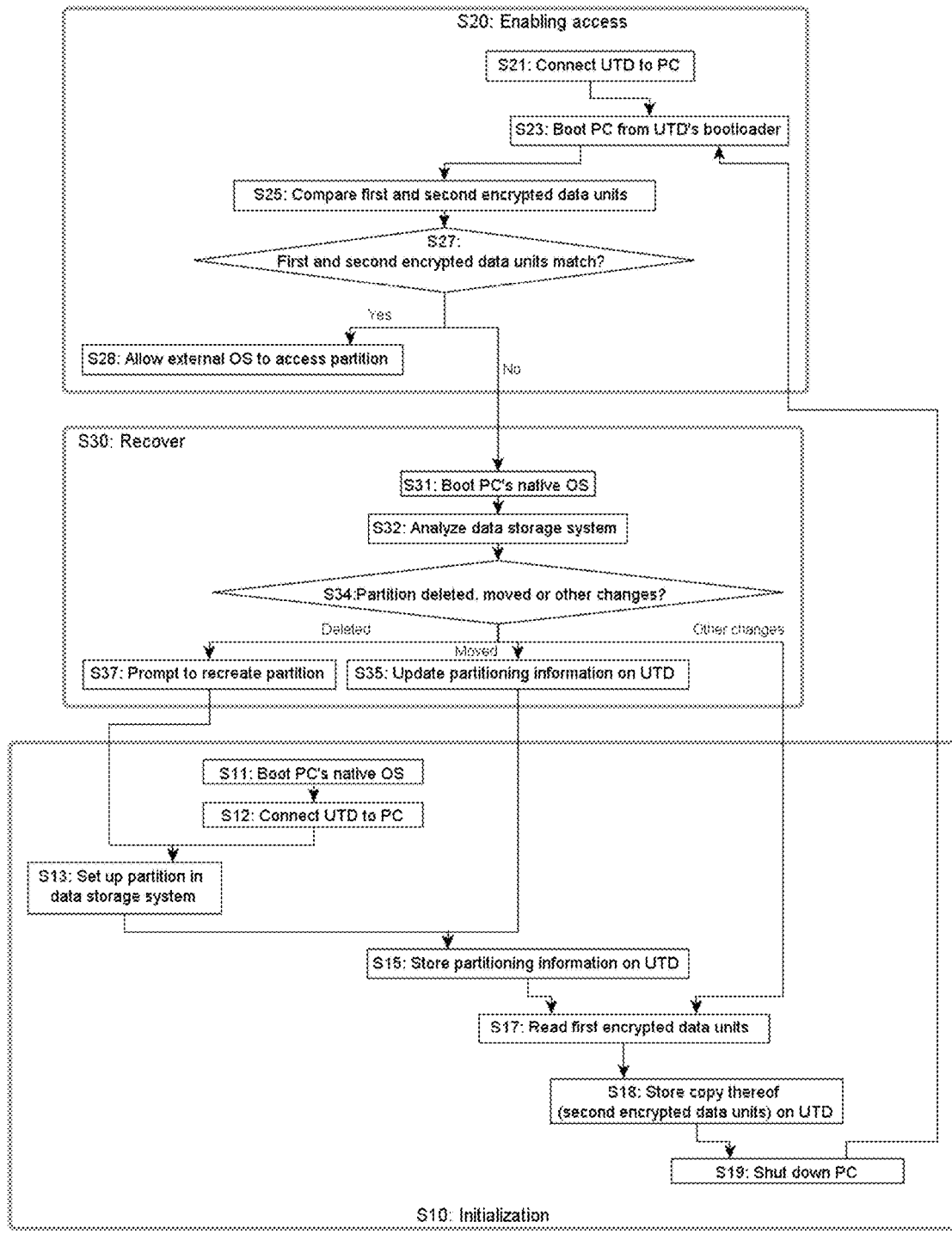
FIG. 3 is a flowchart illustrating high-level steps of a method for allowing an operating system to access encrypted data units of a data storage system of a computer as depicted in FIG. 1, according to embodiments.
Figure 4:
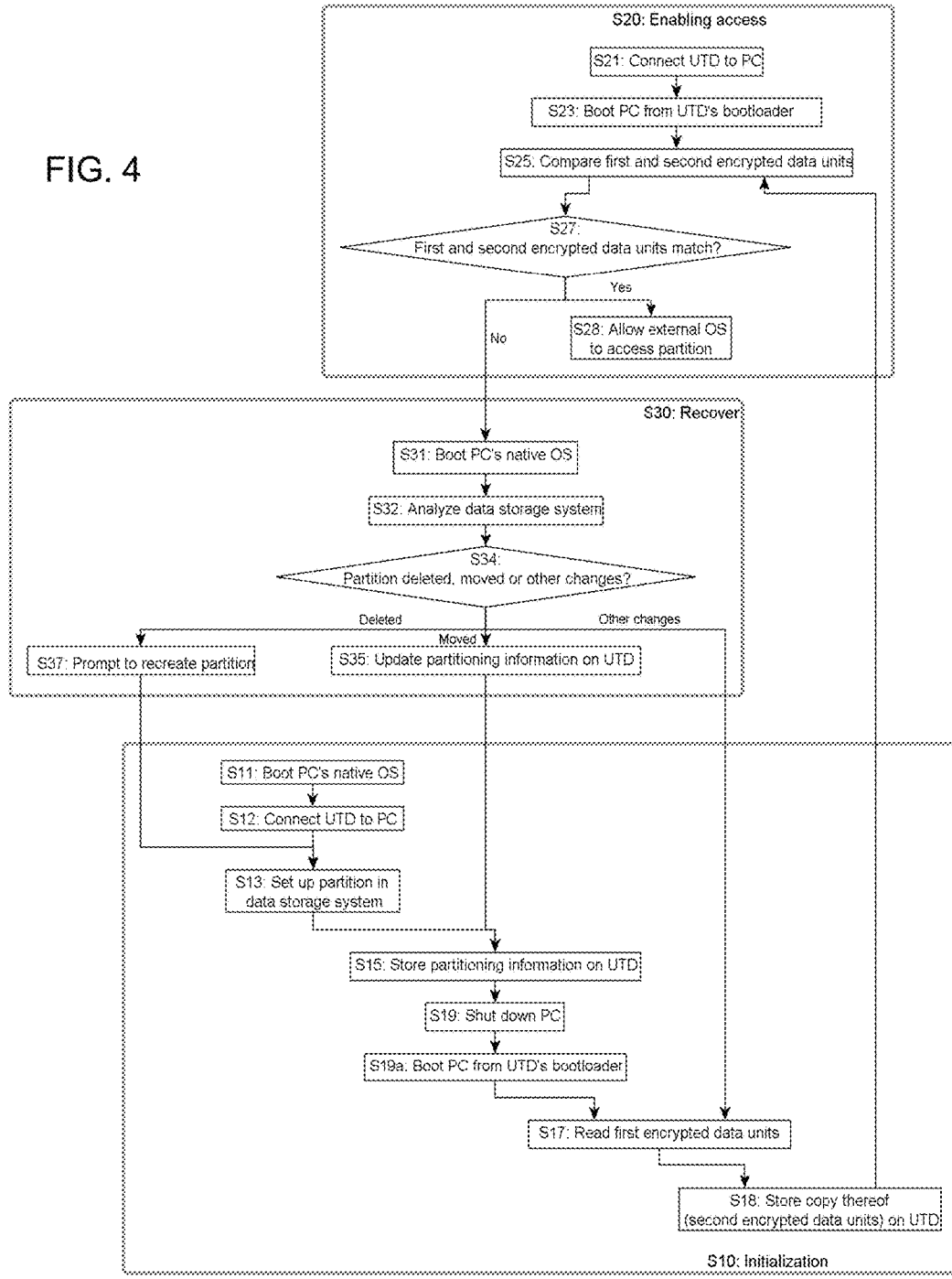
FIG. 4 is a variant to FIG. 3, which can advantageously be used when the native operating system installed on the host computer does not support functions to read raw contents of the encrypted storage system. Similarly, FIGS. 4A and 4B respectively emphasize specific phases of FIG. 4.

Inherently, the novel methods disclosed herein comprise the following fundamental steps, which are otherwise illustrated in FIGS. 3 and 4:

First, upon connection (step S21) of the external device 20 to the computer 10, computerized methods of the device 20 suitably interact with the computer 10 to give instruction to boot (step S23) the computer 10 from the boot loader 24. The latter is initially stored on the external device 20 and shall preferably execute on the device 20 and/or on the computer 10. It may execute partly on the device, partly on the computer 10. Modules thereof may concomitantly (and possibly concurrently) execute on both the computer 10 and the external device 20.

Second, a comparison shall be performed during or after booting of the computer. Namely:
  a. The first 120 and second encrypted data units 220 are compared, step S25; and then
  b. If S27 the first and second encrypted data units match (as per the above comparison), the external OS 112 is allowed S28 to access data units 14 of the partition 122, e.g., data units that span the partition 122. The access by the OS 112 shall be based on the partitioning information 22 that is stored on the external device 20.

Strictly speaking, the external OS may then access one or more data units 14 of the partition 122. Basically, accessing blocks 14 means reading blocks, writing blocks onto the partition 122. Note that the external OS may have its own encryption/decryption module using respective encryption/decryption keys, just like the native OS (though the keys normally differ). However in the absence of such an encryption/decryption module, the external OS 112 shall store data in clear and then be able to read these data in clear.

The second encrypted data units 220 of the partition 122 are needed to perform the comparison S25, which allows to conclude as to whether the partition 122 can be safely accessed. Relying on the sole partitioning information 22 to access the partition's data would be unsafe as the partitioning information 22 alone does not allow to identify whether the partition 122 has been changed, deleted or otherwise reused. The first and second data units 120, 220 are encrypted data, thereby enabling a comparison while not exposing the storage system 11. The second encrypted data units 220 may for instance simply consist of a copy of the first encrypted data units 120, i.e., it can be a copy of the raw encrypted partition table (or part thereof), as stored on the disk 11. Comparing the units 120 and 220 allows to identify whether the partition scheme/layout has changed since the partition was set up, step S13.

To perform the comparison S25, the second encrypted data 220 shall preferably be stored on the external device 20 or on another external device 20*a* (also connectable to the computer 10). Indeed, the "external device" as meant above may in fact consist of several, physically distinct devices 20, 20*a*, as illustrated in FIG. 1. In that case, each device may for instance comprise different components, e.g., one device may comprise the boot loader 24, while another device comprises partitioning information, etc. The second encrypted data units 220, i.e., the reference partition table data, can thus be stored on one of the external devices. Still, one preferably uses one and a same external device 20 for storing both the partitioning information 22 and the second encrypted data 220, provided the device 20 has enough memory, again for security reasons, e.g., data integrity and also expediency and practicality.

In variants, the second encrypted data 220 may have been stored on the data storage system 11, e.g., inside the partition 122, in order to avoid inadvertent interferences between the native OS 111 and the external OS 112, as the normal operation of the computer 10 typically uses another partition 121. Such variants are notably preferred when the external device 20 has not enough memory. They are also preferred when a same external device is used in respect of multiple computers 10 and when one does not want to maintain partition tables for each of these computers on the external devices. This accordingly simplifies the partition management.

In still other variants, said second data units 220 may be available from a server 30, via the computer 10, appropriately connected to the server, see FIG. 1, which still allows the external device to perform the required comparison.

Therefore, the comparison S25 may be performed using second encrypted units 220 that are stored on the external device 20 or that resides on the computer 10 or are available therefrom.

In all cases, the above schemes allow for an external OS to securely access and retrieve data on the partition 122, especially in the absence of the decryption key that was used for encrypting the storage system 11. This makes the above method particularly helpful for BYO scenarios.

The partition table data 120, 220 are data pertaining to a partition table of the data storage system 11 and can be any partition table-related data that enables a meaningful comparison, the point being to be able to identify whether the partition 122 was compromised or otherwise changed. Thus, it does not necessarily need to be the entire partition table, e.g., it can be one or more chosen data chunks of the partition table or, even, a hash value of the table, or a chosen part thereof. Thus, at step S25: at least parts of the partition table data and the reference table data (as stored e.g., on the external device) need be compared.

The subsequent steps S27, S28 (for allowing the external OS 112 to access the partition's data units 14) can involve various different operations. For instance:

If the external OS is started from the external device 20, then access is allowed during or, more likely, after booting S23, notwithstanding the order of steps depicted in the flowchart of FIG. 3 or 4. The external OS 112 may for instance access the partition's data units 14 after having been started. As evoked earlier, accessing the blocks 14 basically means reading/writing blocks onto the partition 122. The external OS 112 may notably use these data units to store data caches, swap files, or other data;

Once said partition 122 has been created and the external OS has been booted once, the external OS may store components thereof on said partition 122 as well. Once these components have been stored on partition 122, the boot loader 24 of the external device 20 may verify the existence of the partition 122 and accesses the partition's data units 14 to start the external OS. Although parts of the external OS are now stored on partition 122, the OS 112 it is still an external OS inasmuch as it cannot be booted natively on the computer without the external device 20.

Figure 3A:
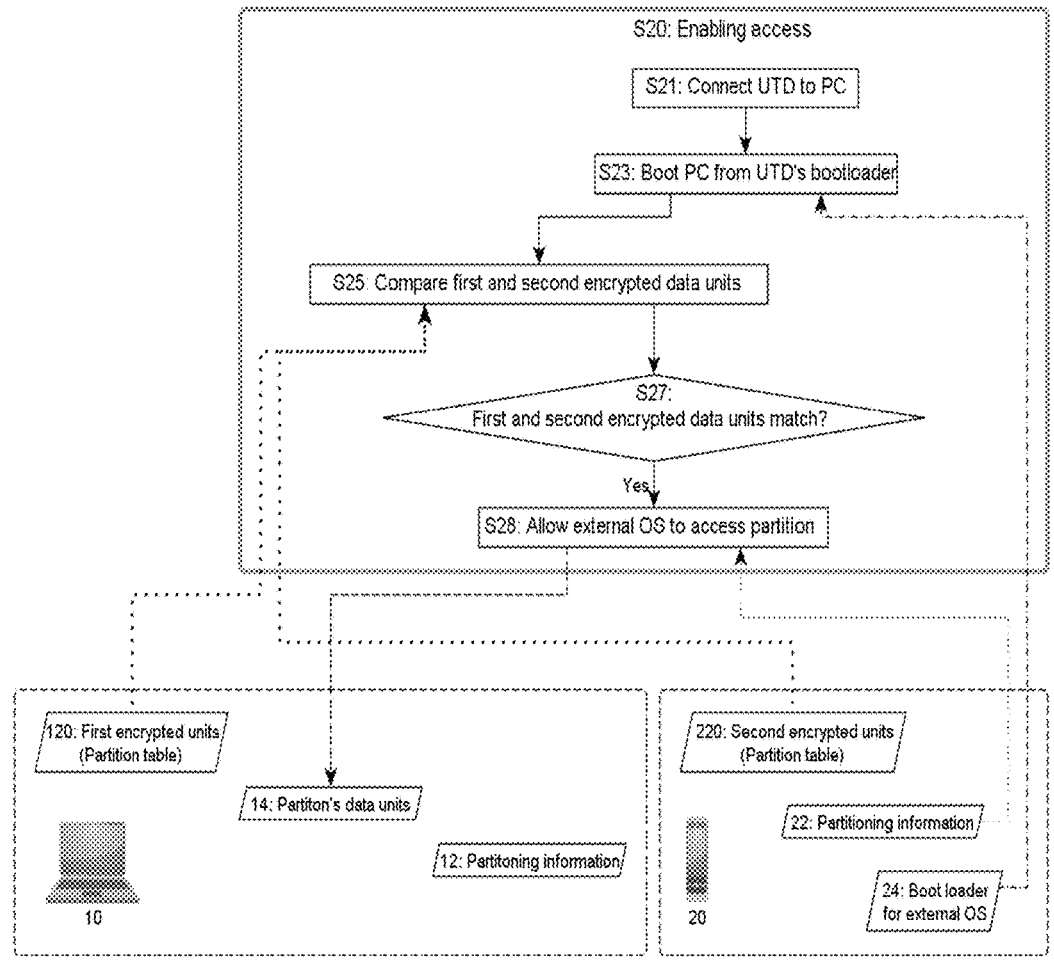
FIGS. 3A and 3B respectively emphasize phases S20 and S10 of FIG. 3 and further show relations between method steps and corresponding data.
Figure 3B:
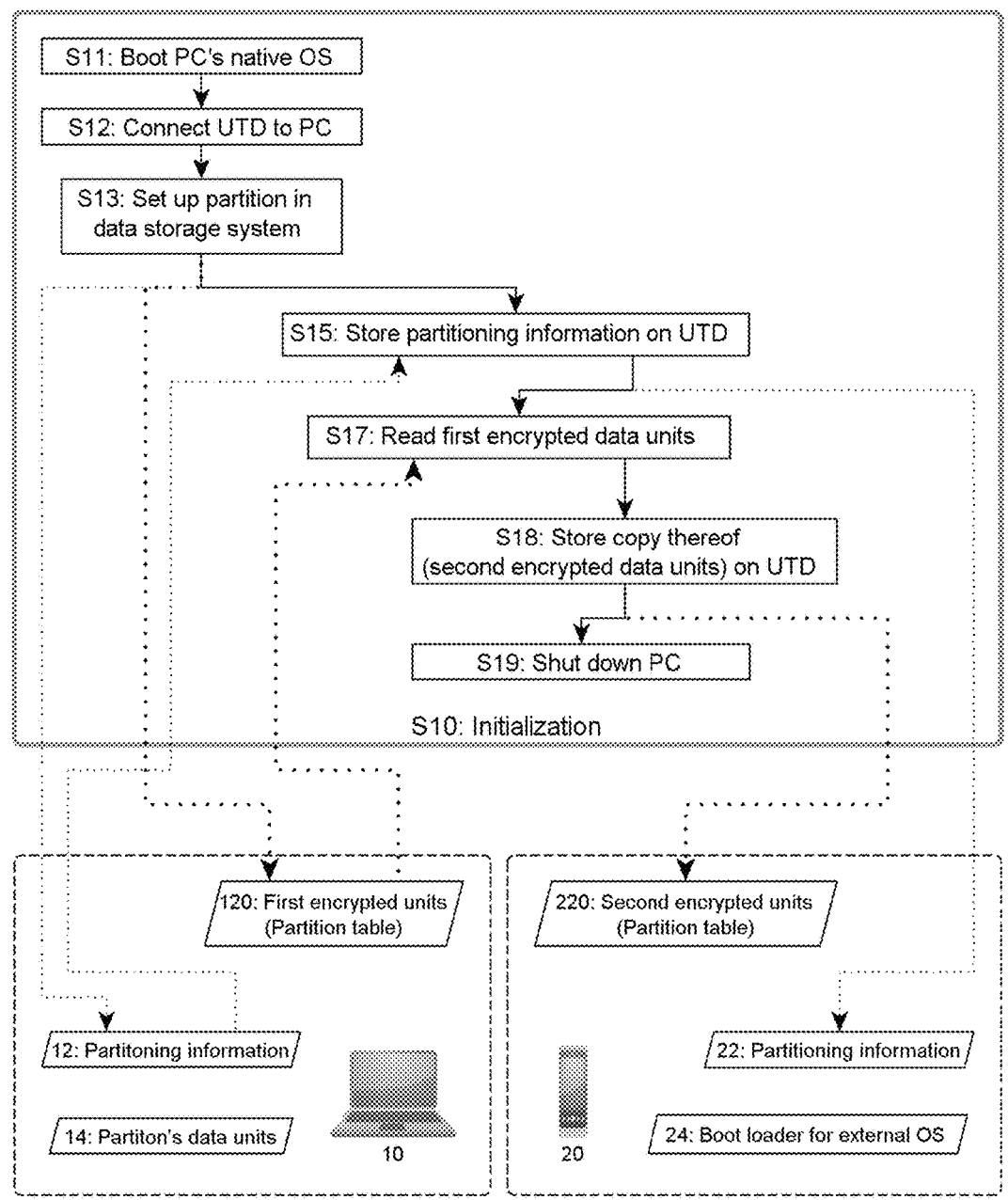
Figure 4A:
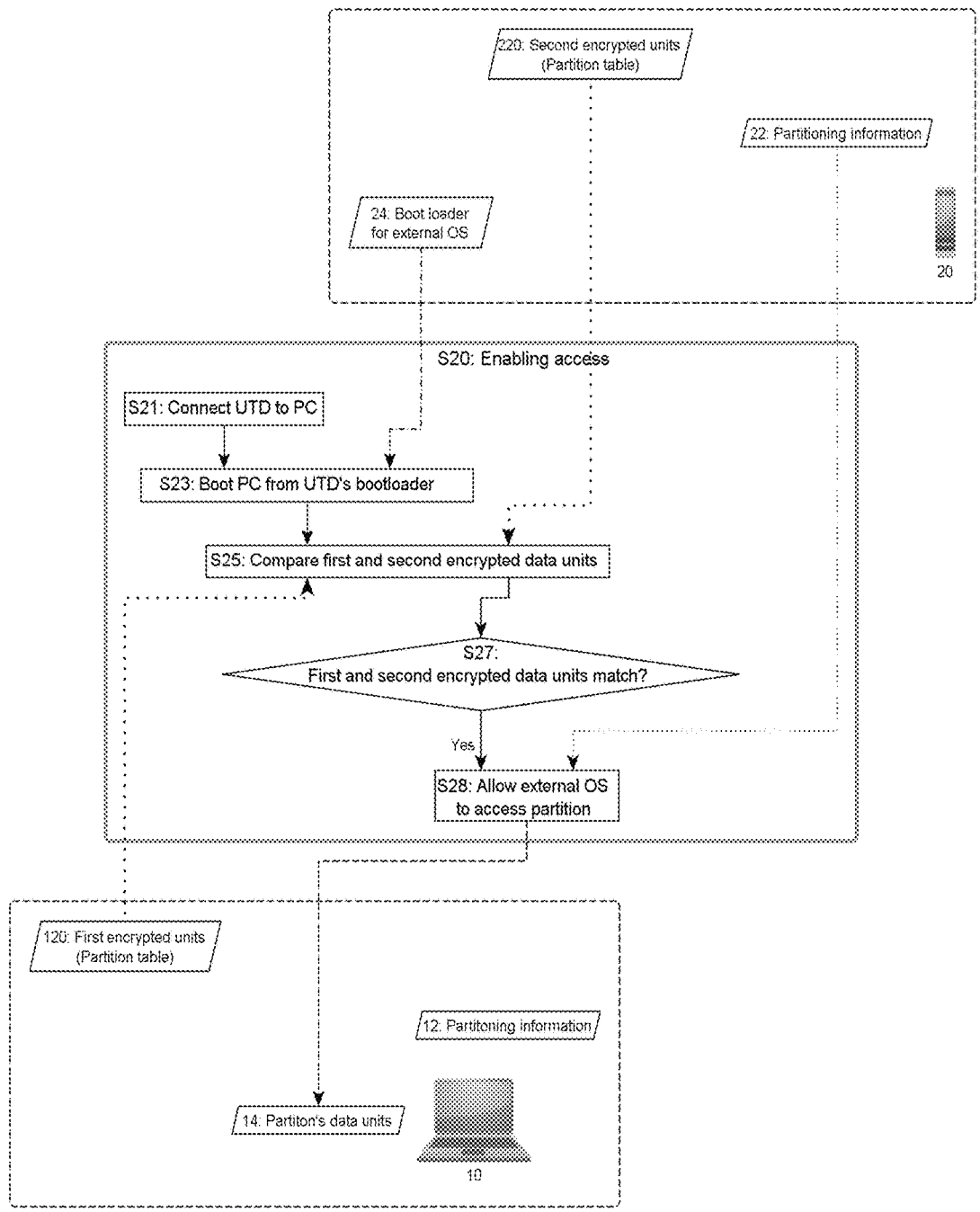

In the following, details of the phases S10, S20 and S30 (which respectively correspond to initialization, enabling and recovery phases) are discussed in reference to FIGS. 3 and 4. More precisely: FIG. 3 corresponds to a preferred embodiment, while FIG. 4 is a variant that is preferred when no native operating system or no suitable native operating system is installed on the host computer. FIGS. 3A-B (and similarly FIG. 4A-B) respectively emphasize phases S20 and S10, and further show relationships between sub-steps and corresponding data, where applicable.

Referring first to FIGS. 3 (in particular 3B) and 4 (4B), the present methods may further comprise, prior to instructing to boot S23 the computer 10 from said boot loader 24, initialization steps aiming at setting up the partition 122 and securing the partition information 22.

More in detail, the partition 122 of the data storage system 11 is set up S13 (using encryption/decryption keys) when said encryption/decryption keys EK, DK (FIG. 1) are available. The encryption key EK is needed for writing to the data storage system, while the decryption key DK is needed for reading from said data storage system. Typically, the partition 122 is set up while booting the computer device's native or host OS 121, as illustrated in FIG. 3 or 4, step S11, as the encryption key EK and decryption key DK are then available. The encryption key EK and decryption key DK are typically the same.

Next, the partitioning information 22 is stored S15 on the external device 20. The partitioning information 22 captures location information about said partition in the data storage system. This information must be available in clear (or at least must be decryptable) and therefore it must be first read when the keys EK, DK are available. This information 22 is stored on the device 20, immediately after reading or later. It can of course reside encrypted on the device 20, thanks to encryption means available at the device.

When setting up the partition 122, step S13, the OS 111 is aware of the partitioning information 22, such that this information 22 can be captured and subsequently be stored on the external device 20. To that aim, one may store, on the external device 20, a software component designed to instruct the native OS 111 (e.g., via an API) to at least partly automate the set up of the partition 122, e.g., in order to minimize user inputs. The partitioning information captures the location of the partition 122 in the storage device or its arrangement thereon if the partition is scattered on the storage device. It may consist of, e.g., start and/or end blocks for a hard disk or a solid-state storage memory, or identifiers of said blocks (e.g., B1, . . . Bf in FIG. 5). As illustrated in FIG. 5, the partitioning information 22 preferably comprises an identifier B1 of a first block and/or an identifier Bf of a last block of this partition 122. Such block identifiers adequately permit to deduce or infer the location of the partition 122 on the storage system 11. Even, only the first B1 or the last block identifier Bf may be needed if the partition size is predetermined. In variants, the entire partition table may be read in clear (as this is normally enabled by the native OS, which was booted at step S11), i.e., an unencrypted version of the first data units 120 may be stored on the device 20 as partitioning information 22, in order to capture relevant elements of the partitioning information that are later needed for the external OS 112 to access the partition 122.

As evoked earlier, there might be several partitions 121, 122 present on the computer's storage system 11 at this stage. Theoretically, one may reuse an already existing partition to set up the new partition 122. But more likely, one will create an entirely new partition 122, because one needs to store data therein and data already stored on a previous partition will be deleted when re-using that partition.

The present methods naturally extend to the creation and subsequent use of multiple such partitions, i.e., such as the partition 122.

Setting up the partition implies storing data pertaining to the external OS 112 (e.g., external OS data, typically user- or private data or, even, cache data, or still the entire external OS), which is not a native or a default OS already installed on the PC. Note that the external OS 112 evoked herein differs from what is usually called a guest OS. That is, the external OS as meant here does not imply or refer to virtualization technologies. Now, embodiments could nevertheless involve a guest OS in some particular cases. In particular, present embodiment do not preclude a guest OS running as part of the external OS. Also, a guest OS may be somehow available to run as part of the native OS. Yet, such a guest OS is irrelevant to the present invention inasmuch as this is the native OS which holds keys EK, DK. Thus, the external OS 112 as meant here should not be confused with a guest OS (i.e., an OS running on a virtual machine) meant to run as part of the native OS, it being noted that such a guest OS would anyway not be "external" to the native OS, but on the contrary hosted by the native OS. Also, OSs 111 and 112 are mutually exclusive inasmuch as the execution of the external OS is, by design, not concomitant with (i.e., excludes a concomitant execution of) the native OS.

In embodiments, the initialization phase S10 further comprises reading S17 the first encrypted data units 120 (on the data storage system 11) and subsequently storing S18 the encrypted data units 220, prior to instructing to boot S23 the computer 10 from said boot loader 24. Hence, reference data 220 are available at the device 20 for a subsequent comparison. Note that the first encrypted data units 120, as they reside on the encrypted storage system 11, are only available in encrypted form to the boot loader 24 and the external OS 112.

As said earlier, the second units 220 preferably are a copy of the first encrypted units 120, for the sake of simplifying the comparison S25. In that respect, the step S17 shall typically involve reading S17 the raw encrypted data units via an OS already installed on the computer 10, e.g., the native OS 111. This can typically be achieved via an application programming interface (or API) of this OS. In such a case, the step of reading S17 can typically be performed just after setting up S13 the partition and storing S15 the partitioning information 22 on the external device, as assumed in FIG. 3 and FIG. 3B. Variants are discussed below in reference to FIG. 4. By raw contents, it is meant encrypted blocks in their encrypted representation.

More generally, the second encrypted data units 220 may comprise part or all of the first encrypted data units 120, or still be a hash value thereof part or all of the first encrypted data units 120. This may be sufficient, as long as one is able to make a meaningful comparison and conclude with confidence that the partition 122 was not compromised or otherwise changed since it was set up. Thus, in some embodiments, one may not need to consider the whole partition table. Rather, storing one data chunks of the partition table or a hash value thereof may suffice.

Figure 4B:
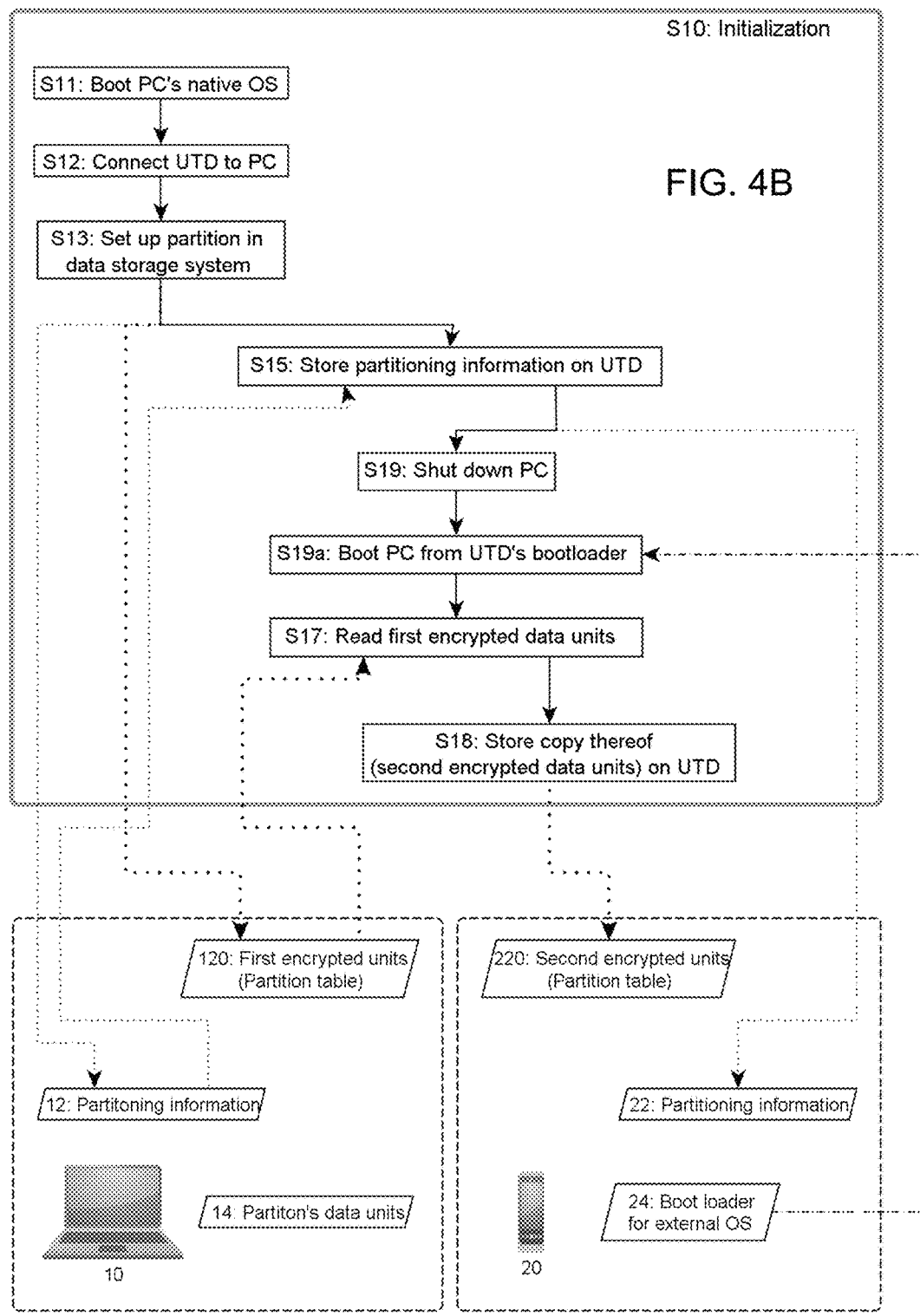

Next referring to FIG. 4, variants are now discussed, which allow to cope with situations where the native OS does not provide any suitable function for reading S17 raw contents of the first encrypted data units 120, i.e., in their encrypted representation. In such cases, the step of reading S17 can still be performed, but this time after shutting down S19 the computer and booting it S19a from the external device, as shown in FIG. 4 (FIG. 4B). More precisely, reading S17 the first encrypted data units is now performed after connecting S12 the external device 20 to the computer 10, shutting down S19 the computer, and instructing it to boot S19a from the boot loader 24. The function that enables reading S17 is now provided by the external device 20, e.g., via or by the boot loader 24 or the external OS itself.

Note, however, that it is still possible to implement aspects of the invention even when no native OS is installed on the computer 10 (not depicted in the appended figures). In such a case, different schemes need be contemplated for setting up the partition and reading raw contents (with respect to the schemes of FIGS. 3-4). Still, the external device 20 can still be used to boot S23 a suitable prepared computer, perform the comparison S25 and possibly allow an external OS to access S28 the encrypted storage system 11.

At present, details of the recovery phase S30 are discussed, in reference to FIGS. 3-4. The recovery phase S30 aims at diagnosing issues with the partition 122 created earlier during the initialization S10 (step S13) and take appropriate actions, which actions may in fact plug back into the initialization phase, as illustrated in FIGS. 3 and 4. In embodiments, if the first and second encrypted data units do not match (test S27), then the computer 10 can be instructed S31 to boot independently from the external OS 112, in order to make the decryption key DK available and hence allow to read data in the data storage system 11. This makes it possible to subsequently analyze S32 the data storage system 11. The analysis S32 shall typically need to decrypt the partition table, which requires this decryption key.

Note that the test S27 occurs at a point where the external OS 112 was already booted (step S23). Yet, the external OS 112 does not possess the necessary decryption key DK. Therefore, one may shut the computer down and reboot S31 it to boot the native OS 111. The native OS 111 holds the decryption keys DK, which makes it possible to decrypt the partition table and analyze the storage system, i.e., to figure out what happened to the partition 122 created earlier.

Various diagnostics may be made and actions accordingly taken. Embodiments may include part or all of the diagnostics and actions described below.

For instance, upon analyzing S32 the data storage system 11: if S27 it turns out S34 that contents of the first encrypted data units 120 have changed, then one would update S17, S18 the second encrypted data units 220 to make them available S18, e.g., from the computer 10 or from said external device 20. Consistently, this may imply storing the updated encrypted data units 220 on the data storage system 11 (preferably inside the partition 122) or the external device 20, as discussed earlier.

If the test S34 reveals that the location of the partition 122 has changed, it is further needed to store S15 updated S35 partitioning information 22 (capturing the changed location of partition 122) on said external device.

Finally, if the partition 122 was deleted or cannot be located, it is moreover needed to set up S13 a new partition of the data storage system, which can for instance be achieved as described earlier, in reference to FIG. 3 or 4.

Referring to FIG. 1, and according to another aspect, the invention can also be embodied as a computerized system 100, comprising: the computer 10 with the data storage system 11, the latter comprising the partition 122 and the first encrypted data units (partition table data of the data storage system 11). This system further comprises the external device 20, consistently with the schemes described above in reference to FIGS. 3-4. The system 100 further comprises the second encrypted data units 220, the latter being available from the data storage system 11 or the external device 20. The system 100 is further equipped with suitable computerized methods, to enable present methods. Some 217 of these methods can notably be stored on the external device 20, in order to implement the steps described above in reference to FIGS. 3 and 4.

Preferably, the external device(s) 20, 20a used in the present methods are user trusted device(s) 20. Note that, independently from these methods, the present invention is also directed to such a user trusted device. Consistently with the core aspects of the aforementioned methods, such a device comprises: said boot loader 24 as well as the partitioning information 22. In addition, it preferably comprises the second encrypted data units 220 too, for reasons mentioned earlier.

An example of such a device 20 is depicted in FIG. 2. It typically comprise a connection interface 212, for enabling connection with a computer 10 and a persistent memory 214. The latter stores the boot loader 24, the partitioning information 22, and preferably the second encrypted data units 220. Furthermore, the memory 224 will preferably store software modules 24a, which, in addition and complementarily to the core functions of the boot loader 24, may notably comprise one or more of: application components; operating system image components for said external OS; and hardware component drivers for said external OS. Now, some of these components may be pre-installed on the computer 10.

In preferred scenarios, the components of the boot loader 24, 24a are initially stored on a user trusted device 20 such as depicted in FIG. 2. An example of suitable device is the so-called Zone Trusted Information Channel device evoked in introduction. This way, improved guarantees are provided as to the temporary booting of the machine 10. For example, an employer can easily keep control of the boot loader 24 present on the device 20 and tight cryptographic control can otherwise be provided on the device, independently from the computer 10, which may not be provided by the employer but instead belong to the employee.

The device 20 is preferably a secure device, i.e., equipped with a secure memory, although this needs not necessarily be the case. Upon connection of the user trusted device 20 to the computer 20, some components of the boot loader 24 may be transferred into the main memory 110 of the computer 10 (assume this is a PC, for illustration) for subsequent execution of the transferred part. As evoked earlier, this transfer is preferably instructed by or via the initialization firmware, e.g., the BIOS. As the boot loader is preferably only partly transferred (e.g., a component thereof is transferred to the PC), its subsequent execution may thus be carried out partly at the PC (e.g., in interaction with the firmware), and partly at the user trusted device 20, with both parts executing interactively.

Note that, in variants, the boot loader components transferred to the PC may also be executed at a graphic card or any suitable extension card of the computer, depending on the types of satellite processing means available. A concurrent (yet interactive) execution partly at the computer, partly at the user device is desired when additional operations need be performed (e.g., verification involving the BIOS), which is possible if the device 20 is equipped with suitable processing means 211.

The modules 24a too may initially be stored on the user trusted device 20. In that case, said modules may be transferred from the user trusted device 20 to the PC 10 for subsequent storage and execution. In variants, the modules 24a could be stored on a remote server or even locally on the PC and their integrity verified using cryptographic checksums or the like. In the former case, an additional communication step is required to contact the server. The core functions 24 of the boot loader (which allows to start the booting S23) are, however, preferably initially stored on the device 20. This is desired, not only in terms of security but also because this allows to keep the boot loader of the PC (the boot loader for the native OS) untouched, while being able to use the same device with any computer that has been prepared consistently with this device, i.e., with or without such an external device in mind. The device 20 is discussed in more detail in the next section.

Finally, and according to still another aspect, the present invention can be embodied as a computer program product for allowing an external OS to access data units of the encrypted data storage system 11 of the computer 10 (or more generally, a computerized system). This computer program product shall comprise a computer-readable storage medium with computer-readable program code embodied therewith, which code is configured to implement methods as described earlier. More details are given in the next section.

The above embodiments and aspects have been succinctly described in reference to the accompanying drawings and may accommodate a number of variants. Several combinations of the above features may be contemplated. Examples are given in the next section.

2. Specific Embodiments/Technical Implementation Details

2.1 Examples of Detailed Embodiments

Preferred applications comprise applications of the present embodiments to BYO scenarios. Thus, in the following we will refer to the external OS 112, i.e., the OS booted from the external device 20, as the BYO OS, whereas the OS initially residing on the computer 10 is referred to as the native OS. Furthermore, a memory stick 20 is used as a user trusted device 20 and a general-purpose PC is used as computer host 10. The PC is equipped with a hard drive 11.

To overcome the problems noted in the introduction, the present approaches allow to store data on the computer's hard disk 11 independently of the file system according to which the computer's hard disk 11 is formatted and this, even if the whole hard disk 11 has been encrypted.

In order to allow the BYO OS 112 to write onto the host's computers hard disk 11, the hard disk 11 is first prepared by creating a disk partition 122 for the present purpose. A problem is that the whole disk 11 is usually encrypted, such that it is not possible, later-on, to identify where the partition 122 is located because the disk's contents can a priori not be decrypted. This problem can be solved using the following method and systems.

1.) The native OS 111 is booted S11, the UTD connected S12 to the PC and a new partition 122 is set up S13. Because it shall later not be possible to identify where the disk partition 122 as the whole disk 11 is encrypted, partitioning information 22 is stored S15 on the UTD 20. This information comprises start and end blocks (block identifiers) and potentially other meta-information of the partition just created or even an entire copy of the (clear-text) partition table; it shall be used to start the BYO (external) OS.

2.) As it can be realized, storing only minimal partitioning information (e.g., start and end blocks) may be unsafe as this does not allow to identify whether said partition 122 has been changed, deleted or reused for other purposes. Without additional protection, the following kinds of interference are possible:

The PC user may delete the partition 122 and use it for storing other data. Not detecting this would make the external OS unaware about the user's action, and may cause to overwrite data stored by the user;

And after the external OS has overwritten user's data, the user (possibly unaware of the interference of the external OS) may again overwrite data that have in the meantime been stored by the external OS, etc.

To avoid such interference, raw block data representing the partitioning layout of the hard disk can be read S17 once the partition 122 has been created, i.e., they are read the way the blocks are stored encrypted on the disk 11, such that the data read reflect the first encrypted data units 120. The blocks read are then stored S18 on the device 20. In absence of appropriate function in the native OS 111 to read raw (i.e., encrypted) contents of the disk 11, the approach of FIG. 4 is chosen.

3.) Once all necessary data are stored on the external device 20, we can shut down S19 the host OS. The initialization (or setup) phase is completed.

After the partition 122 has been set up for the BYO OS 112, we can reboot the computer and then start S23 the BYO OS from the external device 20. The BYO OS will be started from suitably designed modules of boot loader. While the boot loader 24 cannot decrypt blocks holding the partitioning information 22 and hence, identify the presence of partition 122, it can nevertheless compare S25 the blocks 120 storing partition table data on the hard disk 11 with the copy 220 that has previously been stored on the external device 20. If S27 the copies match (e.g., are identical), the partition was not changed. Thus, the BYO OS can be started S28 and accordingly accesses partition 122: the BYO OS can use blocks spanning said partition, thanks to the partitioning information previously stored on the device 20 for its own purpose. These blocks may notably be used for maintaining a data cache, for storing a swap file, installing a copy of the BYO OS (the first time the computer is booted). On subsequent start-ups, the PC may be booted from the user trusted device 20, which starts the OS from the copy stored in partition 122.

Whenever the partition 122 of the computer is changed, the above comparison will fail, even if the partition 122 is still present on the computer. Whether the partition is present, or has been removed cannot be straightforwardly identified since the disk blocks are encrypted. However, it is possible to analyze this situation by re-booting S31 the PC's native OS, from which one can read the partitioning information 22, for further analysis S32. Once the PC has been booted S31, one can verify the presence of partition 122.

If partition 122 is still present and was not moved, one may create a copy of the first data blocks in their encrypted representation (capturing the partition table 120) and store this copy on the external device 20 as updated second data blocks 220.

If partition 122 is still present but was moved, one may also copy the first data blocks in their encrypted representation and store it on the external device 20 as (an updated version of the) second data blocks 220 as well as store the new partitioning information 22 on the external device 20 such that during subsequent uses of the external OS the new location of partition 122 is being used.

If S34 the partition is no longer present, the partition can be created S13 anew.

After this analysis phase (which potentially recreates partition 122), one can again start the BYO OS. If the native OS does not provide any suitable function to read the raw contents of the disk blocks (i.e. the encrypted blocks), the above mechanism has to be changed slightly, cf. FIG. 4. At present, instead of directly copying S17-18 the contents of the blocks 120, in a first step we only store the block identifiers (partitioning information 22) on the external device 20, step S15. Once this is done, the PC is shut down S19 and booted S19a from the external device 20 without changing the partitioning information 22 in-between. Once we have booted from the external device, the contents 120 of said blocks are copied S17 and stored S18 onto the external device 20.

Another danger comes from accidental usage of the partition 122 for other data. This is the case if somebody identifies the partition 122 and decides to use said partition, unchanged for another purpose. Note that, in this case, the user purposely decides to delete the data on this partition. Yet, one may want to identify such a situation if we start the computer again through the external device 20, to avoid the same type of interference already described above.

The following can for instance be used. In order to partition hard disks for PCs, two prevalent partitioning schemes are: the Microsoft Partitioning Scheme (MPT) used by MSDOS and older versions of Windows and the GUID Partitioning Scheme (GPT), which is based on Globally Unique Identifiers (GUIDs) as specified as part of the UEFI specification.

In case of MPT, each partition stores the type of data stored on the partition. This field may have one of 127 different values. If the purpose of the partition changes, it is extremely likely that this type changes and hence such a change would be reflected in a change of the data units representing the disks partitioning scheme 120, which we can identify as described above.

Still, owing to the aforementioned 127 different values, there is a small chance that the same type might be reused for a different purpose, for instance, if a non-standard OS is installed on the computer. In this case, the protection mechanism can be combined with additional protection mechanisms such as:

Storing a magic field inside the partition 122, for instance as part of the partition's first block Hashing certain blocks within the partition 122, or Using a combination of the above protection mechanisms.

Whenever the BYO operating system is started, these identification points are compared in addition to comparing the partition table data by recomputing the identification marks and comparing whether they match identification marks stored on the external device 20.

In case of GPT, each partition contains a GUID as the type, as well as a GUID as an identifier of the partition. When the partition is formatted a new GUID is written to the identifier field, therefore changing first data blocks. Due to the fact that GUIDs are globally unique, no further protection is necessary.

For other partitioning schemes, the same or similar considerations as for MPT or GPT apply.

2.2 User Trusted Device

Referring now more particularly to FIG. 2, possible embodiments of the user trusted device 20 are now discussed in detail.

The external device is preferably a user trusted device 20. Also various types of trusted devices can be contemplated for implementing present methods, the user trusted device 20 should be reasonably "mobile" to allow for an easy and practical connection with the computer 10. It is typically a corporate or personal secure device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device weighs less than 200 g. However, owing to the rather limited requirements in terms of user interfaces, memory and processing capability of the device 20, this device shall preferably weighs less than 60 g and more preferably less than 40 g.

The user trusted device 20 may be provided with processing means (and/or computing means, i.e., CPU) 11, such as a crypto Processor, coupled to a memory, which more generally comprises a persistent memory 214 and, possibly, a non-persistent memory too (not explicitly shown but the non-persistent memory can be considered to be part of the processing means 211). Yet, a non-persistent memory and a processor are not mandatory for implementing the essential steps described earlier (they are needed only if additional functionality is sought, such as additional verifications involving the BIOS, as evoked earlier). In the present context, the persistent memory notably stores computerized methods 217, interacting with other components stored on the device 20, which components may be executable modules or code 24, 24a, data 22, 24a, 220, keys 213 or still other peripheral components 218, as necessary for operating the device 20. In particular, said methods 217 may interact with the processing means 211 to trigger the boot enabling modules 24 of the boot loader, the latter meant to be executed by processing means 105, 211 of the computer 10 and/or the device 20. The boot enabling modules can also be regarded as a single module 24 provided with different functions, and able to execute at the device and/or the computer. The boot enabling modules 24 may also be regarded as forming parts of the methods 217.

Preferably, the portion(s) of the boot enabling module(s) that reside on the user trusted device shall occupy as little memory as possible. For instance, some implementations have been successfully tested which use less than 4 ko for the boot enabling modules. Additionally, the user trusted device should provide enough storage capability for storing data units 220 and partitioning information 22 which may typically take up to 64 ko. This excludes storage necessary to store the components of the external OS 112 or components that are able to retrieve such an external OS from the network.

The connection interface 212 of the PC 10 and the device 20 may for instance be of the following type:
- Universal Serial Bus or USB;
- External Small Computer System Interface or SCSI;
- External Serial Advanced Technology Attachment or SATA;
- Firewire; or
- Thunderbolt.

More generally though, this could be any current or future connector (wired or wireless) that allows the computer 10 to boot from the external device 20. In addition, the same interface 212 can furthermore allow the user trusted device 20 for communicating with any external device such as a beamer, a printer, or any other output device.

If necessary, the secure device 20 has a card reader to read user credentials stored on a memory card, e.g., the non-secure memory or any smart card. Suitable use can safely be made out of such data, e.g., user credentials as stored on the card. In particular, a trustworthy connection can be established between a user (or strictly speaking the device 20) and a third party, e.g., server 30, via the host 10 and using such data. In a variant, the user credentials may be stored directly on the secure device. Further usual interfaces (like control buttons and display) may be provided to allow for interaction with the user. Most notably, such trustworthy display on the secure device 20 can be used to obtain user assertions about the environment s/he presently is in. This way, for example, but without limitation, a user can confirm requests by the server 30 to ascertain that s/he is not in a public space such as an Internet café, when starting the computer 10.

2.3 General Aspects of Computerized Systems, Devices and Computer Program Products Suitable for Implementing Embodiments of the Invention FIG. 1 represents a general computerized system 100, suited for implementing method steps as involved in embodiments of the invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented at least partly in software, firmware, hardware, or combinations thereof. In exemplary embodiments, the methods described herein are implemented at least partly as executable programs (e.g., being part of a boot loader) and is executed at least in part by a special or general-purpose digital computer 10, such as a personal computer, workstation, minicomputer, or mainframe computer. The most general system 100 therefore includes general-purpose computer, e.g., a PC 10.

In exemplary embodiments, in terms of hardware architecture, as shown in FIG. 1, the computer 10 includes a processor 105, memory 110 coupled to a memory controller 115, and one or more input and/or output (I/O) devices (or peripherals) 20, 20a, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 20a, 145 may generally include any generalized cryptographic card or smart card known in the art. One or more of these devices may be user trusted devices 20, 20a, discussed above.

The processor 105 is a hardware device for executing software, particularly, software that is stored in memory 110. The processor 105 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The main memory 110 includes volatile memory elements (e.g., random access memory (RAM, such as DRAM, SRAM, SDRAM, etc.)) and possibly nonvolatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate or link to electronic, magnetic, optical, and/or other types of storage media. Note that the memory 110 can have a distributed architecture, where various components are situated remote from one another, but can be accessed by the processor 105. Memory portions can be allocated to specific purposes, e.g., to be mounted as a RAM disk, to receive components 24, 24a of a boot loader such as executable modules (including processor instruction modules), for subsequent execution at the computer 10.

In operation, software/program code involved in embodiments of this invention, for instance software/program code to be transferred to memory 110, may include one or more separate programs, each of which comprises a listing of executable instructions for implementing logical functions. In the example of FIG. 1, memory 110 may be loaded with instructions for enabling the computer 10 to start and complete booting from the user trusted device 20.

Some of the software modules to be loaded in memory 110 may comprise various components 24a, including application components and operating system image components, and preferably hardware component drivers too. The memory 110 may thus be set in condition to execute a suitable operating system (OS) 112. Notwithstanding, the novel methods discussed here operate at least partly "before" any OS component be fully loaded at the host 10. At least some of these steps operate at another level, closer to hardware, whereby the normal behavior of the computer 10 is impacted). Upon (and if) executing, the native OS 111 or the external OS 112 shall essentially control the execution of application programs, and provide scheduling, input-output control, file and data management, memory management, and communication control and related services.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 20 and/or the host 10. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware, where needed, and with the device's CPU 11, as needed.

In exemplary embodiments, a conventional keyboard 150 and mouse 155 can be coupled to the input/output controller 135. Other I/O devices 145 may include, for example a printer, a scanner, microphone, and the like. Finally, the I/O devices 20, 20a, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As otherwise evoked in the previous section, the I/O devices 20, 20a, 145 may comprise any generalized cryptographic card or smart card known in the art. The system 100 can further include a display controller 125 coupled to a display 130. In exemplary embodiments, the system 100 can further include a network interface 124 for coupling to a network 165. The network 165 can be an IP-based network for communication between the computer 10 and any external server, client and the like via a broadband connection. The network 165 transmits and receives data between the computer 10 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 10 is a PC, workstation, intelligent device or the like, the software in the memory 110 may further include a basic input output system (BIOS) or any similar initialization software. The BIOS is a set of essential software routines that initialize and test hardware at startup. It is otherwise generally able to start an OS, and support the transfer of data among the hardware devices. The BIOS is typically stored in ROM so that the BIOS can be executed when the computer 10 is activated.

For the purpose of implementing methods as described herein, the BIOS can be used (interacted with) notably to initiate the boot process and complete it, as well as, possibly, to initiate a communication over a network. More generally though, any suitable firmware or interface to a firmware (i.e., a combination of persistent memory and program code and data stored therein, which operates "below" any OS 111, 112 in the software stack), can be used to that aim. This typically is the BIOS. However, examples of suitable firmwares or interface thereto include a Preboot eXecution Environment (PXE) BIOS, the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, UEFI provides the same and even more functionality than a traditional PC BIOS and can be used as well. More generally, any initialization firmware operating below the operating system in the software stack may potentially convene for the purpose of implementing the present invention.

When the computer 10 is in operation, the processor 105 is configured to execute software stored within the memory 110, to communicate data to and from the memory 110, and to generally control operations of the computer 10 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely firmware and/or software embodiment (firmware, resident software, micro-code, etc.) or an embodiment combining firmware/software and hardware aspects that may all generally be referred to herein as "modules", "computerized methods", "processes", "components" or "schemes", etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, or partly on the user's computer (as a stand-alone software package), or still partly on two or more of the following: the user's computer 10, the user trusted device 20, and a remote computer 30. The host computer and the server may be connected through any type of network, including: local area network (LAN); wide area network (WAN); connection to an external computer (Internet, using an Internet Service Provider).

Aspects of the present invention are described below with reference to flowchart illustrations and/or block diagrams of methods, apparatus (systems) and computer program products according to embodiments of the invention. It will be understood that at least some of the blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, at least some of the blocks in the flowchart or block diagrams may represent a module, segment, or portion of code, which comprises one or more executable instructions for implementing the specified logical function(s). It should also be noted that, in some alternative implementations, the functions noted in a block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

2.4 Final Considerations

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, the secure device could be powered with solar cells or any other suitable batteries, etc. As touched earlier, the computerized methods described herein have been described according to their main functions, e.g., some of which have been assigned to various modules of the boot loader 24. However, embodiments of the present invention could be equivalently described with the same functions recast over only one module, or more modules.

The invention claimed is:
1. A computerized system, comprising:
a computer having an encrypted data storage system; and
an external device having a connection interface for enabling connection with the computer to securely boot the computer,
wherein the computer comprises:
one or more partitions: and
first encrypted data units that comprise partition table data of said encrypted data storage system, and
wherein said external device comprises a boot loader used to execute an external operating system (OS) that is not installed or not completely installed on the computer, and
wherein the external device further comprises second encrypted data units that comprise reference partition table data for said encrypted data storage system,
wherein the external device further comprises a processor and a memory coupled to the processor, said memory configuring said processor to perform a method comprising:
upon connection of said external device to the computer, instructing to boot the computer from said boot loader;
during or after booting of the computer;
comparing a first hash value of the partition table data of the first encrypted data units and a second hash value of the reference partition table data of the second encrypted data units;
if the first and second hash values match to each other, allowing the external OS to access, based on partitioning information stored on the external device, one or more data units of each of said one or more partitions on the encrypted data storage system;

prior to instructing to boot the computer from said boot loader:

setting up said one or more partitions of the encrypted data storage system using an encryption key and a decryption key; and storing, on said external device, said partitioning information comprising: at least one of locations of the one or more partitions that have been set up using said encryption key and said decryption key; and an arrangement of the one or more partitions.

2. The computerized system of claim 1, wherein said second encrypted data units are available from said encrypted data storage system or said external device.

3. A user trusted device for securely booting a computer, wherein the user trusted device has a connection interface for enabling connection with the computer, comprising:

a boot loader configured for allowing to boot said computer therefrom using an external operating system (OS) which is not installed or not completely installed on said computer; and second encrypted data units that comprise reference partition table data for an encrypted data storage system of said computer, wherein said second encrypted data units match first encrypted data units stored on said encrypted data storage system of said computer, wherein the user trusted device further comprising a processor and a memory coupled to the processor, said memory configuring said processor to perform a method comprising:

upon connection of said user trusted device to the computer, instructing to boot the computer from said boot loader;

during or after booting of the computer;

comparing a first hash value of the partition table data of the first encrypted data units and a second hash value of the reference partition table data of the second encrypted data units;

responsive to determination of the second hash value matching to the first hash value, allowing the external OS to access, based on partitioning information stored on the user trusted device, one or more data units of each of one or more partitions on the encrypted data storage system;

prior to instructing to boot the computer from said boot loader:

setting up said one or more partitions of the encrypted data storage system using an encryption key and a decryption key; and storing, on said user trusted device, said partitioning information comprising: at least one of locations of the one or more partitions that have been set up using said encryption key and said decryption key; and an arrangement of the one or more partitions.

4. A computer program product of controlling access of an operating system (OS) to first encrypted data units of an encrypted data storage system of a computer to securely boot the computer, the computer program product comprising a computer readable storage medium having computer-readable program code embodied therewith, the computer-readable program code configured to implement a method comprising:

upon connection of an external device to the computer, instructing to boot the computer from a boot loader of the external device used to execute an external OS that is not installed or not completely installed on the computer;

during or after booting of the computer:

comparing a first hash value of the partition table data of the first encrypted data units with a second hash value of reference partition table data of the second encrypted data units of the external device; and if the first and second hash values match to each other, allowing the external OS to access, based on partitioning information stored on the external device, one or more data units of each of one or more partitions stored on the encrypted data storage system;

prior to instructing to boot the computer from said boot loader:

setting up said one or more partitions of the encrypted data storage system using an encryption key and a decryption key; and storing, on said external device, said partitioning information comprising: at least one of locations of the one or more partitions that have been set up using said encryption key and said decryption key; and an arrangement of the one or more partitions.

5. The computer program product of claim 4, wherein said partitioning information further comprises an identifier (B1) of a first block and/or an identifier (Bf) of a last block of each of the one or more partitions.

6. The computer program product of claim 5, wherein the computer-readable program code is further configured to implement a method comprising, prior to instructing to boot the computer from said boot loader: reading, from the encrypted data storage system, said first encrypted data units and storing the second encrypted data units, which are a copy of said first encrypted data units, wherein reading said first encrypted data units comprises reading one or more chunks of the partition table data via an OS installed on the computer.

7. The computer program product of claim 6, wherein reading said first encrypted data units is performed after connecting said external device to the computer and after instructing to boot the computer from said boot loader, according to a function provided by said external device, by the boot loader itself or the external OS itself.

8. The computer program product of claim 6, wherein, at the step of comparing the first hash value of the partition table data of the first encrypted data units with the second hash value of the reference partition table data of the second encrypted data units, the second encrypted data units reside on said external device or on another external device having a connection interface for enabling connection with the computer.

9. The computer program product of claim 6, wherein, at the step of comparing first hash value of the partition table data of the first encrypted data units with the second hash value of the reference partition table data of the second encrypted data units, the second encrypted data units reside on the encrypted data storage system.

10. The computer program product of claim 4, wherein the computer-readable program code is further configured to implement a method comprising:

if the first and second hash values do not match, then:
instructing the computer to boot independently from said external OS to make available another decryption key for reading from said encrypted data storage system; and analyzing the encrypted data storage system, wherein analyzing comprises decrypting the partition table data using the another decryption key.

11. The computer program product of claim 10, wherein the computer-readable program code is further configured to implement a method comprising, upon analyzing the encrypted data storage system: if contents of the first encrypted data units have changed, updating said second encrypted data units to make them available from said computer or from said external device, by storing said second encrypted data units on one of: said external device; or the encrypted data storage system.

12. The computer program product of claim 10, wherein the computer-readable program code is further configured to implement a method comprising, upon analyzing the encrypted data storage system: if a location of at least one of the one or more partitions has changed, updating the partitioning information to include the location of said at least one of the one or more partitions that has changed; and storing, on said external device, the updated partitioning information.

13. The computer program product of claim 10, wherein the computer-readable program code is further configured to implement a method comprising, upon analyzing the encrypted data storage system: if at least one of one or more partitions was deleted, setting up a new partition of the encrypted data storage system.

14. The computer program product of claim 4, wherein said external device is a user trusted device, comprising; a connection interface enabling connection with the computer; and a persistent memory, wherein the persistent memory stores:

said boot loader for said external OS;

said partitioning information;

said second encrypted data units; and software modules, which comprise one or more of the following: application components; operating system image components for said external OS; and hardware component drivers for said external OS.

* * * * *